(12) United States Patent
Wartnick (10) Patent No.: US 9,684,563 B1
(45) Date of Patent: Jun. 20, 2017

(54) TECHNIQUES FOR BACKUP MANAGEMENT

(75) Inventor: Jeremy Howard Wartnick, Minnetonka, MN (US)

(73) Assignee: Veritas Technologies LLC, Mountain View, CA (US)

( * ) Notice: Subject to any disclaimer, the term of this patent is extended or adjusted under 35 U.S.C. 154(b) by 1041 days.

(21) Appl. No.: 12/651,644

(22) Filed: Jan. 4, 2010

(51) Int. Cl.
*G06F 12/16* (2006.01)
*G06F 11/14* (2006.01)
*G06F 1/26* (2006.01)

(52) U.S. Cl.
CPC ...... *G06F 11/1451* (2013.01); *G06F 11/1458* (2013.01); *G06F 11/1461* (2013.01); *G06F 11/1464* (2013.01); *G06F 1/263* (2013.01)

(58) Field of Classification Search
CPC ............ G06F 11/1451; G06F 11/1464; G06F 11/1458; G06F 11/1461; G06F 1/263
USPC ......... 711/161, 162; 707/646, 647, 652, 653
See application file for complete search history.

(56) References Cited

U.S. PATENT DOCUMENTS

| | | | |
|---|---|---|---|
| 5,454,099 A * | 9/1995 | Myers et al. ................... | 714/6.3 |
| 5,649,196 A * | 7/1997 | Woodhill ............ | G06F 11/1451 |
| | | | 707/999.009 |
| 6,785,786 B1 * | 8/2004 | Gold et al. ..................... | 711/162 |
| 6,957,355 B2 * | 10/2005 | Acton et al. ................... | 713/340 |
| 7,574,461 B1 * | 8/2009 | Armorer et al. | |
| 8,301,772 B2 * | 10/2012 | Zeis et al. ...................... | 709/226 |
| 8,543,615 B1 * | 9/2013 | Nair et al. ..................... | 707/802 |
| 2003/0065959 A1 * | 4/2003 | Morrow ............... | G06F 1/3203 |
| | | | 713/300 |
| 2006/0013219 A1 * | 1/2006 | Neilson et al. ................ | 370/389 |
| 2007/0136541 A1 * | 6/2007 | Herz et al. ..................... | 711/162 |
| 2008/0046483 A1 * | 2/2008 | Lehr et al. ..................... | 707/204 |
| 2008/0065905 A1 * | 3/2008 | Salessi .................... | G06F 21/31 |
| | | | 713/193 |
| 2008/0288559 A1 * | 11/2008 | Ahmed et al. ................ | 707/204 |
| 2009/0210738 A1 * | 8/2009 | Kimura ......................... | 713/340 |
| 2009/0300633 A1 * | 12/2009 | Altrichter et al. ............ | 718/103 |
| 2010/0257142 A1 * | 10/2010 | Murphy et al. ............... | 707/681 |
| 2011/0016260 A1 * | 1/2011 | Lomelino et al. ............ | 711/103 |

OTHER PUBLICATIONS

Pat Stemen, "Power Management in Windows Vista"; Microsoft WinHEC 2006; 44 pages.

* cited by examiner

*Primary Examiner* — David X Yi
*Assistant Examiner* — Ramon A Mercado
(74) *Attorney, Agent, or Firm* — Wilmer Cutler Pickering Hale and Dorr LLP (57) ABSTRACT

Techniques for backup management are disclosed. In one particular exemplary embodiment, the techniques may be realized as a method for backup management comprising the steps of receiving power level information from a backup client, determining a factor, based at least in part on the power level information, affecting a backup time window for the backup client, identifying a portion of data of the backup client for backup based on the determination, and providing an instruction to the backup client communicating the identified portion of data.

18 Claims, 4 Drawing Sheets

TECHNIQUES FOR BACKUP MANAGEMENT

FIELD OF THE DISCLOSURE

The present disclosure relates generally to backing up data and, more particularly, to techniques for backup management.

BACKGROUND OF THE DISCLOSURE

Backup clients may include devices that run on battery power, such as mobile devices. Backup clients may also include clients that experience power loss and run on backup power (e.g., an Uninterruptable Power Supply (UPS)). Backup clients running on battery or backup power may have a limited time window to complete a backup, which may depend on a power level of a battery. A backup job may be terminated prior to completion if power runs out.

In view of the foregoing, it may be understood that there may be significant problems and shortcomings associated with current backup management technologies.

SUMMARY OF THE DISCLOSURE

Techniques for backup management are disclosed. In one particular exemplary embodiment, the techniques may be realized as a method for backup management comprising the steps of receiving power level information from a backup client, determining a factor, based at least in part on the power level information, affecting a backup time window for the backup client, identifying a portion of data of the backup client for backup based on the determination, and providing an instruction to the backup client communicating the identified portion of data.

In accordance with other aspects of this particular exemplary embodiment, the factor affecting a backup time window for the backup client may comprise a remaining time the backup client is available for backup based on the received power level information.

In accordance with further aspects of this particular exemplary embodiment, the factor affecting a backup time window for the backup client may comprise a network bandwidth measurement of a network link to the backup client.

In accordance with additional aspects of this particular exemplary embodiment, the factor affecting a backup time window for the backup client may comprise at least one of a CPU load of a network element available to receive data from the backup client and disk resources of a network element available to receive data from the backup client.

In accordance with additional aspects of this particular exemplary embodiment, the factor affecting a backup time window for the backup client may comprise a priority associated with data of the backup client.

In accordance with additional aspects of this particular exemplary embodiment, the determination of the factor affecting the backup time window for the backup client may comprise a comparison of the priority of a backup of the backup client with a backup priority of one or more other backup clients.

In accordance with additional aspects of this particular exemplary embodiment, the method may further comprise altering an amount of backup resources available for a backup client based on the comparison.

In accordance with additional aspects of this particular exemplary embodiment, the instruction may comprises an instruction specifying a type of backup to perform.

In accordance with additional aspects of this particular exemplary embodiment, the type of backup to perform may comprise at least one of: a full backup, an incremental backup, and a differential backup.

In accordance with additional aspects of this particular exemplary embodiment, the method may further comprise receiving data from the backup client.

In accordance with additional aspects of this particular exemplary embodiment, the method may further comprise changing a backup checkpoint interval based at least in part on the received power level.

In accordance with additional aspects of this particular exemplary embodiment, the techniques may be realized as at least one processor readable medium for storing a computer program of instructions configured to be readable by at least one processor for instructing the at least one processor to execute a computer process for performing the method.

In another particular exemplary embodiment, the techniques may be realized as an article of manufacture for backup management, the article of manufacture comprising at least one processor readable medium, and instructions stored on the at least one medium. The instructions may be configured to be readable from the at least one medium by at least one processor and thereby cause the at least one processor to operate so as to receive power level information from a backup client, determine a factor, based at least in part on the power level information, affecting a backup time window for the backup client, identify a portion of data of the backup client for backup based on the determination, and provide an instruction to the backup client communicating the identified portion of data.

In yet another particular exemplary embodiment, the techniques may be realized as a system for backup management comprising one or more processors communicatively coupled to a network, wherein the one or more processors are configured to receive power level information from a backup client, determine a factor, based at least in part on the power level information, affecting a backup time window for the backup client, identify a portion of data of the backup client for backup based on the determination, and provide an instruction to the backup client communicating the identified portion of data.

In accordance with additional aspects of this particular exemplary embodiment, the factor affecting a backup time window for the backup client may comprise a remaining time the backup client is available for backup based on the received power level information.

In accordance with additional aspects of this particular exemplary embodiment, the factor affecting a backup time window for the backup client may comprise a network bandwidth measurement of a network link to the backup client.

In accordance with additional aspects of this particular exemplary embodiment, the factor affecting a backup time window for the backup client may comprise at least one of a CPU load of a network element available to receive data from the backup client and disk resources of a network element available to receive data from the backup client.

In accordance with additional aspects of this particular exemplary embodiment, the determination of the factor affecting the backup time window for the backup client may comprise a comparison of the priority of a backup of the backup client with a backup priority of one or more other backup clients.

In accordance with additional aspects of this particular exemplary embodiment, the instruction may comprise an instruction specifying a type of backup to perform.

In accordance with additional aspects of this particular exemplary embodiment, the one or more processors may be further configured to receive data from the backup client.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
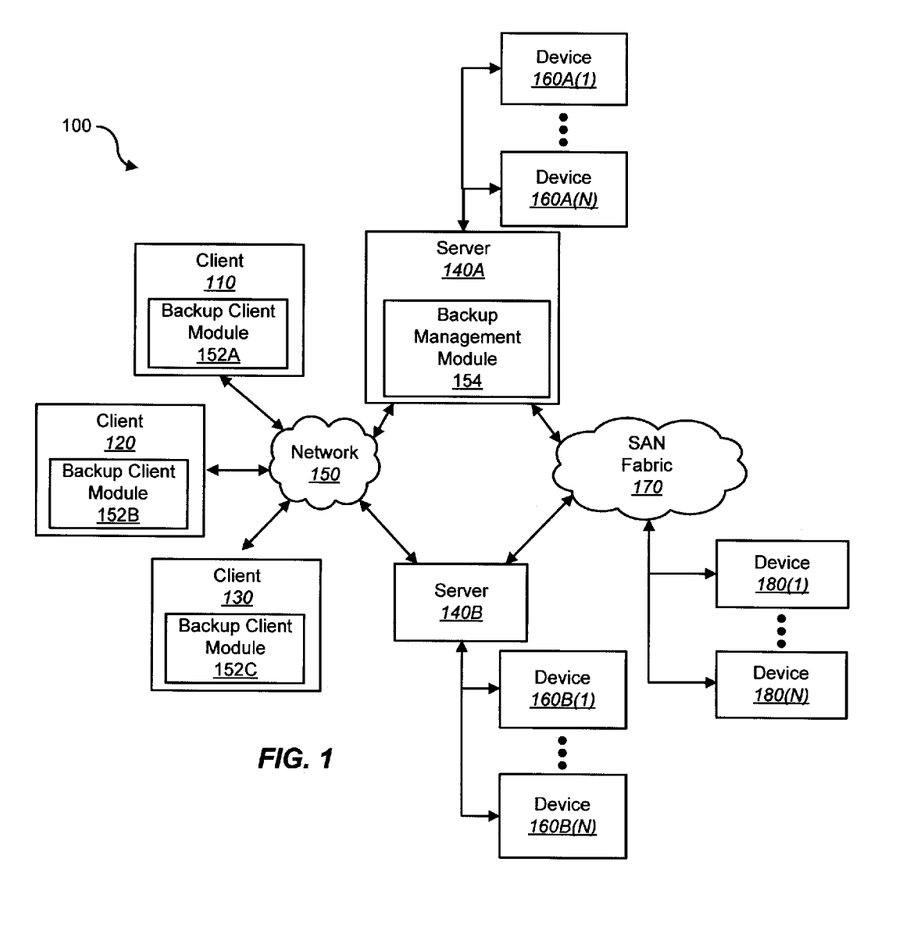
FIG. 1 shows a block diagram depicting a network architecture for client power level aware backup management in accordance with an embodiment of the present disclosure.

FIG. 1 shows a block diagram depicting a network architecture 100 for client power level aware backup management in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120, and 130 may contain backup client modules 152A, 152B, and 152C, respectively. Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a backup module (e.g., backup management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
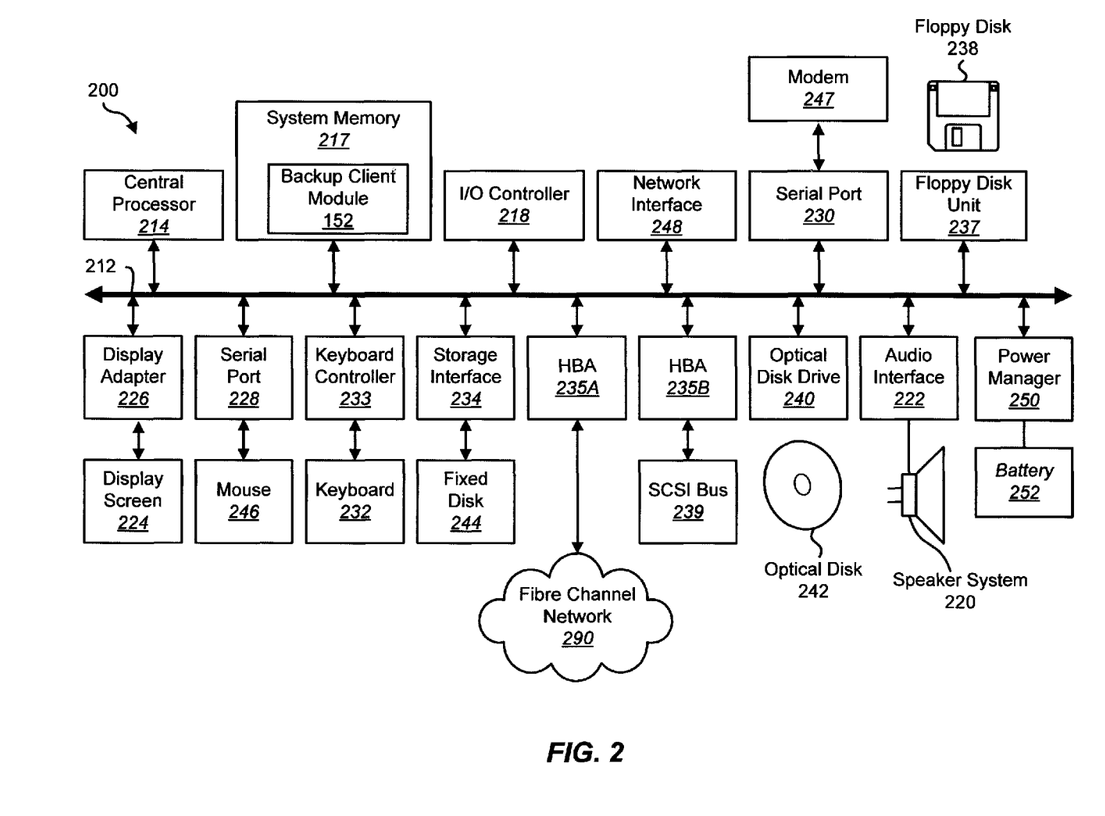
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Network 150 may be a local area network (LAN), a wide area network (WAN), the Internet, a cellular network, a satellite network, or another network that permits communication between clients 110, 120, 130, servers 140, and other devices communicatively coupled to network 150. Network 150 may further include one, or any number, of the exemplary types of networks mentioned above operating as a stand-alone network or in cooperation with each other. Network 150 may utilize one or more protocols of one or more clients or servers to which it is communicatively coupled. Network 150 may translate to or from other protocols to one or more protocols of network devices. Although network 150 is depicted as one network, it should be appreciated that according to one or more embodiments, network 150 may comprise a plurality of interconnected networks.

Storage devices 160A(1)-(N), 160B(1)-(N), and/or 180 (1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up data. One or more portions of data may be backed up based on a backup policy applied, attributes associated with the data source, space available for backup, space available at the data source, power available at a client, or other factors.

According to some embodiments, clients 110, 120, and/or 130 may backup data based on a policy supplied by a backup management server. Backup client modules 152A, 152B, and/or 152C may transmit client information and backup data to one or more backup processes. For example, backup client modules 152A, 152B, and 152C may provide information to backup management module 154. Information provided to backup management module 154 or another backup module or process may include, but is not limited to, a power level of a client (e.g., a battery level of client 110), one or more file sizes, and one or more indicators of a backup importance (e.g., a user associated with data on a client, a group associated with data on a client, a file type on a client, a file name on a client, and a time since a last backup). Other information provided to a backup management module by a client may include network connectivity information (e.g., an interface type, bandwidth, etc.), processor information (e.g., a processor load or utilization information), and other information about a backup client that may affect a backup client's ability to stream backup data.

Backup management module 154 may receive client information and backup information from one or more backup clients (e.g., clients 110, 120, and 130). Backup management module 154 may provide a backup policy to backup clients 110, 120, and/or 130 that may determine backup behavior of a client. The backup policy may contain one or more thresholds based at least in part on a power level of the client. For example, if a client is not relying on battery power (e.g., a battery of the client or an UPS) the client may proceed with a first level of backup (e.g., a full backup). If a client is on battery, the power level may be measured and compared against a threshold in a backup policy for the client. Backup behavior may be modified accordingly. The power level may be measured to determine a percentage remaining, an estimated remaining time for a backup window (e.g., the time left before the client would power down), a rate of power consumption, or other factors. According to some embodiments, a backup policy may implement different backup actions based at least in part on a remaining power level of a client (e.g., greater than twenty percent, less than twenty percent, less than ten percent, and less than five percent). For example, if a client has less than twenty percent power remaining a backup type may be changed from a full backup to a partial backup, or a differential backup. If a client has less than ten percent remaining, a portion of data backed up may be reduced. File sizes may be evaluated, the importance of files may be evaluated (e.g., one or more factors may be provided to evaluate a files importance), de-duplication of data may be performed, compression of data may be performed, and encryption of one or more portions of data may not be performed. According to some embodiments, one or more processes of a client may be halted or terminated to reduce power consumption, or peripherals or portions of device functionality may be disabled. For example, a display may be powered down, or the initiation of applications may temporarily be disabled (e.g., an anti-virus scan may not be allowed to initiate during a backup on a client with a power level lower than a specified percentage). If a client has less than five percent of a power level remaining, a backup may be postponed.

Other factors considered by backup management module 154 may include the status and availability of one or more network elements to perform a backup and the status of one or more other backup clients. For example, a backup management module (e.g., backup management module 154, a similar backup management module running on server 140*b*, or a backup management process or module running on another network element) may determine the status of and availability of one or more backup resources such as storage devices 160A(1)-(N), 160B(1)-(N), and/or 180(1)-(N). Backup management module 154 may evaluate disk resources of storage devices 160A(1)-(N), 160B(1)-(N), and/or 180(1)-(N) such as, by way of non-limiting example, storage device utilization level and response time. Backup management module 154 may also evaluate network bandwidth utilization of one or more network links or components between a backup client and storage for a backup.

Backup management module 154 may estimate a required backup time for a backup client based on the size of data to be backed up including processing time for the backup data on the backup client (e.g., de-duplication time, compression time, encryption time, formatting time), network transmission time, and other factors. Historical client information may be kept to estimate an average transmission time or it may be estimated by information received from a backup client module (e.g., network interface information, processor information, memory information, file size information, etc.). Backup management module 154 may compare an estimated backup time against an estimated backup window. Backup management module 154 may modify a backup job of a client based at least in part on this comparison. Modifications of a backup job may include changing a scope of a backup (e.g., adding or removing files from a planned backup). A modification of a backup job may be based in part on an indication of data importance or criticality (e.g., certain data may be backed up based on a data type, an associated user, an associated group, and/or an associated author). Modifications of a backup job may also include changing a type of a backup (e.g., switching from a full backup to an incremental or differential backup). Modifications of a backup job may also include reducing processing required for a backup (e.g., skipping encryption for one or more files which may be less sensitive or are being transmitted securely, skipping de-duplication if processing overhead would require more power than would be saved by client backup operations of de-duplicated data, and skipping compression if processing overhead would require more power than would be saved by client backup operations of compressed data). According to some embodiments, backup management module 154 may transfer one or more processing steps from a backup client to another networked device to reduce backup power requirements of a backup client. For example, encryption may be performed by a component of server 140A for backup data received from clients 110, 120, and/or 130 if a backup client power level is below a specified threshold. This may allow secure storage of data while reducing backup processing overhead for a client.

Backup management module 154 may receive information about a signal strength of a network connection of a backup client. If a client switches from a cable based connection to a wireless network connection or from a wireless network connection to a cable based connection, backup management module 154 may modify a backup policy accordingly. The backup policy may change one or more backup job attributes in response to detected or received change in network connection bandwidth or network connection signal strength. For example, for clients identified as mobile clients, backup management module 154 may expedite a backup job or decrease the size of a backup job in response to a decrease in client network connection signal strength.

According to one or more embodiments, backup management module 154 may improve backup throughput for a backup client by performing one or more actions. For example, backup management module 154 may halt, interrupt, suspend, or terminate one or more processes performed by a backup server to decrease utilization and improve performance for a backup client.

According to some embodiments, backup management module 154 may receive backup client information, as described above, for a plurality of backup clients. Backup management module 154 may determine a backup priority among clients using one or more factors. For example, if backup management module 154 receives information indicating that client 110 has a low power level (e.g., a battery level with less than twenty percent remaining) and clients 120 and 130 have high power levels, backup management module 154 may give priority to client 110. Backup management module 154 may change a backup schedule for clients 110, 120, and/or 130 to give priority to client 110. Backup management module 154 may also reallocate backup resources among one or more clients to prioritize a backup job. For example, backup management module 154 may ensure that a larger portion of bandwidth, a larger portion of CPU time, and/or a larger portion of storage related resources is provided to a client with a higher priority. Other factors may be considered when determining a client priority such as, for example, a criticality associated with the data, a user associated with the data, a group associated with the data, a backup client associated with the data, and a last backup date of the data.

Backup management module 154 may also perform other actions in response to a determination that a backup client is at a low power level. For example, backup management module 154 may increase the frequency of checkpoints in a backup process. A backup policy may perform checkpoints every five minutes for a backup client with a power level above a specified level. For a client with a power level below a specified level checkpoints may be performed every two minutes or every minute. This may decrease an amount of received data in a backup that may have to be discarded in the event a backup does not complete.

According to some embodiments, backup policies may control backup jobs. Backup policies may be made on a backup server implemented by server for the client (i.e., a backup client may receive only the information necessary to run a backup job). A backup policy may also be made on a backup server and implemented by a backup client. If a backup client or a backup management module determines that a client's power level has changed (e.g., the client was connected to mains), a backup policy for the client may be modified accordingly, or the client may apply a portion of the backup policy applicable in the event the client is connected to mains.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, backup client module 152 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
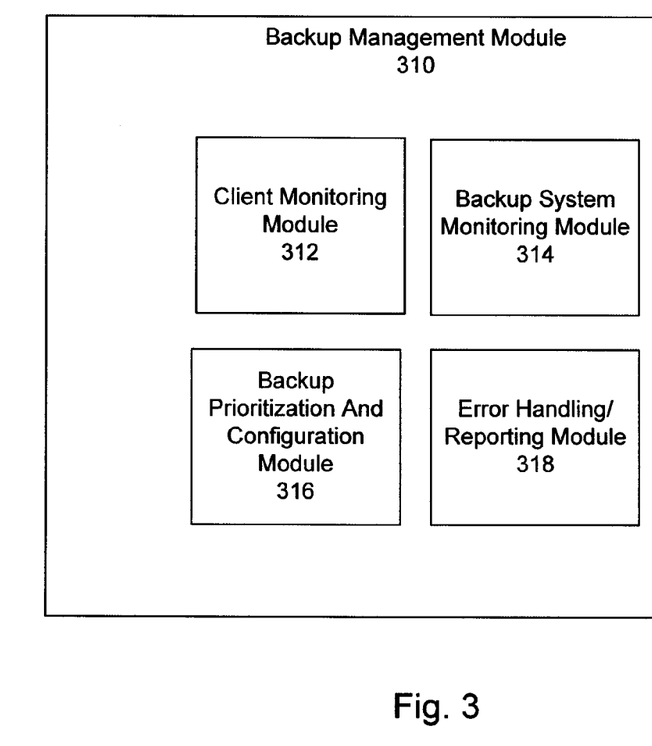
FIG. 3 shows a module for client power level aware backup management in accordance with an embodiment of the present disclosure.

Referring to FIG. 3, there is shown a backup management module 310 in accordance with an embodiment of the present disclosure. As illustrated, the backup management module 310 may contain one or more components including a client monitoring module 312, a backup system monitoring module 314, a backup prioritization and configuration module 316, and an error handling/reporting module 318.

The description below describes network elements, computers, and/or components of a system and method for client power level aware backup management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Client monitoring module 312 may monitor a power level of a backup client, a backup status of a backup client, and/or other backup client attributes or factors which may affect backup. Client monitoring module 312 may provide information about a priority of data on a backup client, a file size or data size on a backup client, memory utilization of a backup client, processor utilization of a backup client, storage device information of a backup client (e.g., utilization and a throughput, access, or read rate), network bandwidth of a backup client, signal strength of wireless network connection of a backup client. Client monitoring module 312 may reside on a backup client or remote from the backup client. According to some embodiments, client monitoring module 312 may monitor a plurality of backup clients.

Backup system monitoring module 314 may monitor the status of one or more components of a backup system. Backup system monitoring module 314 may determine the status of and availability of one or more backup resources such as storage devices 160A(1)-(N), 160B(1)-(N), and/or 180(1)-(N). Backup management module 154 may evaluate disk resources of storage devices 160A(1)-(N), 160B(1)-(N), and/or 180(1)-(N) such as, by way of non-limiting example, storage device utilization level and response time. Backup management module 154 may also evaluate network bandwidth utilization of one or more network links or components between a backup client and storage for a backup. Backup management module 154 may evaluate CPU utilization and/or memory utilization of one or more backup components such as, for example, a backup server.

Backup prioritization and configuration module 316 may evaluate information received from one or more client monitoring modules 312. Backup prioritization and configuration module 316 may create and/or modify backup policies for one or more backup clients. Backup prioritization and configuration module 316 may modify or create a backup policy based on received backup client data such as, for example, a client power level. Backup prioritization and configuration module 316 may modify a backup policy to establish a backup priority among a plurality of backup clients.

Error handling/reporting module 318 may handle one or more errors associated with backup administration and/or backup clients. Error handling/reporting module 318 may produce logs, reports, or other information associated with backup errors. Data collected by error handling/reporting module 318 and reporting module may be used to refine backup policies (e.g., determine ways to further streamline backups for backup clients with a low power level).

Figure 4:
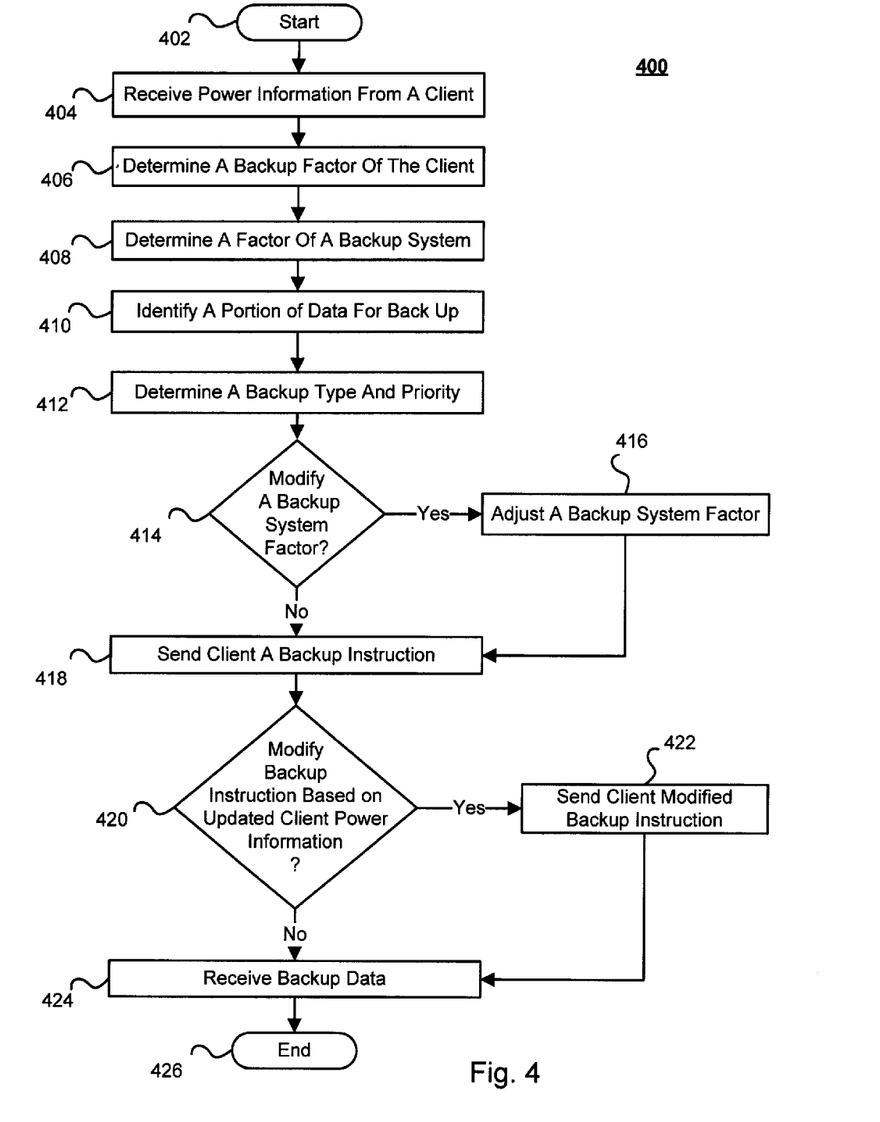
FIG. 4 depicts a method for client power level aware backup management in accordance with an embodiment of the present disclosure.

Referring to FIG. 4, there is depicted a method 400 for backup management in accordance with an embodiment of the present disclosure. At block 402, the method 400 may begin.

At block 404, power information and other information may be received from a backup client.

At block 406, a backup factor of a backup client may be determined. For example, one or more file sizes, a remaining amount of client power, a power consumption rate, a network bandwidth, a processor utilization level, and/or a memory utilization level may be determined.

At block 408, one or more factors of a backup system may be determined. For example, network bandwidth, processor utilization, one or more attributes or backup policies of other network clients, and/or storage utilization (e.g., available storage space and storage processing bandwidth).

At block 410, a portion of data to be backed up may be identified. The identification may be based on attributes associated with the data such as a user, a group, and a data type. The identification may also be based on a criticality of the data, a last date the data was backed up, a size of the data, and a request for the data to be backed up. According to some embodiments, the portion of data identified for backup may be determined based at least in part on a power level of a backup client.

At block 412, a backup type and priority may be determined for one or more backup clients. The backup type may include, but is not limited to, a full backup, a differential backup, and an incremental backup. A backup priority may be determined relative to other backup clients. The backup priority and backup type may be based on one or more factors including: a power level of a client, a criticality of backup data on a client, an amount of backup data on a client, data throughput from a client, a last backup data of a client, and a priority of one or more other backup clients.

At block 414, it may be determined whether a backup system factor should be modified. If a backup system factor should be modified the method 400 may continue at block 416. If a backup system factor is not to be modified the method 400 may continue at block 418.

At block 416, a backup system factor may be modified. For example, one or more resources may be reallocated to provide priority to a backup job of one or more backup clients. Reallocated resources may include, for example, CPU time, network bandwidth, and storage device priority. Processes which are not associated with a priority backup may be suspended, terminated, and/or interrupted according to some embodiments. Other backup system factors may include changing a checkpoint frequency for a backup job.

At block 418, a backup client may receive a backup instruction. The backup instruction may be received as a backup policy or a modification to a backup policy.

At block 420, a backup instruction may be modified based on information received about a backup client such as, for example, power level information associated with a backup client. For example, if a backup management module receives information associated with an amount of power remaining for a client (e.g., a battery level), an indicator that a client has switched from mains (e.g., AC) to battery power, and/or an indicator that a client has switched from battery to mains, a backup instruction may be modified. According to some embodiments, one or more backup instructions may be contained in a backup profile contained on a client. The backup profile may contain different backup configurations to use based on a power level or other factors associated with the client. If a backup instruction is to be modified the method 400 may continue at block 422. If a backup instruction is not to be modified the method 400 may continue at block 424.

At block 422, a modified backup instruction may be sent to one or more backup clients. According to some embodiments, backup instructions may be sent as backup profiles. Backup profiles may already be contained on one or more clients and a backup server, backup module, and/or backup process may send an indicator of which portion of a backup profile a client should apply.

At block 424, backup data may be received from one or more backup clients.

At block 426, the method 400 may end.

At this point it should be noted that backup management in accordance with the present disclosure as described above typically involves the processing of input data and the generation of output data to some extent. This input data processing and output data generation may be implemented in hardware or software. For example, specific electronic components may be employed in a backup management module or similar or related circuitry for implementing the functions associated with backup management in accordance with the present disclosure as described above. Alternatively, one or more processors operating in accordance with instructions may implement the functions associated with backup management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for backup management comprising the steps of:
   receiving power level information from a backup client;
   determining a factor, based at least in part on the power level information, affecting an amount of backup resources available during a backup time window for the backup client, wherein the factor includes at least an indication of an importance of one or more files;
   determining, based on the factor, at least one process to terminate on the backup client to reduce power consumption;
   identifying a portion of data of the backup client for backup, wherein a size of the portion of data is based on the factor;
   reducing processing required for the portion of data, wherein the reduction in processing comprises at least one of skipping encryption, skipping de-duplication, skipping compression, or skipping anti-virus scan;
   changing a backup checkpoint interval based at least in part on a power level of the power level information such that a first checkpoint interval when the power level is below a threshold level is more frequent than a second checkpoint interval when the power level is above the threshold level; and
   providing an instruction containing an indication of the at least one process to terminate and the identified portion of data to the backup client.

2. The method of claim 1, wherein the factor affecting a backup time window for the backup client comprises a remaining time the backup client is available for backup based on the power level information.

3. The method of claim 1, wherein the factor affecting a backup time window for the backup client comprises a network bandwidth measurement of a network link to the backup client.

4. The method of claim 1, wherein the factor affecting a backup time window for the backup client comprises at least one of a CPU load of a network element available to receive data from the backup client and disk resources of a network element available to receive data from the backup client.

5. The method of claim 1, wherein the factor affecting a backup time window for the backup client comprises a priority associated with data of the backup client.

6. The method of claim 1, wherein the determination of the factor affecting the backup time window for the backup client comprises a comparison of the priority of a backup of the backup client with a backup priority of one or more other backup clients.

7. The method of claim 6, further comprising altering an amount of backup resources available for a backup client based on the comparison.

8. The method of claim 1, wherein the instruction comprises an instruction specifying a type of backup to perform.

9. The method of claim 8, wherein the type of backup to perform comprises at least one of: a full backup, an incremental backup, and a differential backup.

10. The method of claim 1, further comprising receiving data from the backup client.

11. An article of manufacture for backup management, the article of manufacture comprising:
    at least one non-transitory processor readable storage medium; and
    instructions stored on the at least one non-transitory processor readable storage medium;
    wherein the instructions are configured to be readable from the at least one non-transitory processor readable storage medium by at least one processor and thereby cause the at least one processor to operate so as to:
    receive power level information from a backup client;
    determine a factor, based at least in part on the power level information, affecting an amount of resources available during a backup time window for the backup client, wherein the factor includes at least an indication of an importance of one or more files;
    determine, based on the factor, at least one process to terminate on the backup client to reduce power consumption;

identify a portion of data of the backup client for backup, wherein a size of the portion of data is based on the factor;

reduce processing required for the portion of data, wherein the reduction in processing comprises at least one of skipping encryption, skipping de-duplication, skipping compression, or skipping anti-virus scan;

change a backup checkpoint interval based at least in part on a power level of the power level information such that a first checkpoint interval when the power level is below a threshold level is more frequent than a second checkpoint interval when the power level is above the threshold level; and provide an instruction containing an indication of the at least one process to terminate and the identified portion of data to the backup client.

12. A system for backup management comprising:

memory; and one or more processors communicatively coupled to the memory; wherein the one or more processors are configured to:

receive power level information from a backup client;

determine a factor, based at least in part on the power level information, affecting an amount of backup resources available during a backup time window for the backup client, wherein the factor includes at least an indication of an importance of one or more files;

determine, based on the factor, at least one process to terminate on the backup client to reduce power consumption;

identify a portion of data of the backup client for backup, wherein a size of the portion of data is based on the factor;

reduce processing required for the portion of data, wherein the reduction in processing comprises at least one of skipping encryption, skipping de-duplication, skipping compression, or skipping anti-virus scan;

change a backup checkpoint interval based at least in part on a power level of the power level information such that a first checkpoint interval when the power level is below a threshold level is more frequent than a second checkpoint interval when the power level is above the threshold level; and provide an instruction containing an indication of the at least one process to terminate and the identified portion of data to the backup client communicating the identified portion of data.

13. The system of claim 12, wherein the factor affecting a backup time window for the backup client comprises a remaining time the backup client is available for backup based on the power level information.

14. The system of claim 12, wherein the factor affecting a backup time window for the backup client comprises a network bandwidth measurement of a network link to the backup client.

15. The system of claim 12, wherein the factor affecting a backup time window for the backup client comprises at least one of a CPU load of a network element available to receive data from the backup client and disk resources of a network element available to receive data from the backup client.

16. The system of claim 12, wherein the determination of the factor affecting the backup time window for the backup client comprises a comparison of the priority of a backup of the backup client with a backup priority of one or more other backup clients.

17. The system of claim 12, wherein the instruction comprises an instruction specifying a type of backup to perform.

18. The system of claim 12, wherein the one or more processors are further configured to receive data from the backup client.

* * * * *